United States Patent [19]

Margolis

[11] Patent Number: 5,054,896
[45] Date of Patent: Oct. 8, 1991

[54] CONTINUOUSLY FOCUSABLE MICROSCOPE INCORPORATING AN AFOCAL VARIATOR OPTICAL SYSTEM

[75] Inventor: H. Jay Margolis, Boulder, Colo.
[73] Assignee: Infinity Photo-Optical Corporation, Boulder, Colo.
[21] Appl. No.: 342,179
[22] Filed: Apr. 24, 1989

Related U.S. Application Data

[63] Continuation-in-part of Ser. No. 286,307, Dec. 19, 1988, Pat. No. 4,988,173, which is a continuation-in-part of Ser. No. 169,271, May 17, 1988, abandoned.

[51] Int. Cl.$^5$ .......................... G02B 15/00; G02B 7/04; G02B 21/00
[52] U.S. Cl. ..................................... 359/379; 359/676; 359/823
[58] Field of Search ................ 350/423, 518, 519, 255

[56] References Cited

U.S. PATENT DOCUMENTS 4,318,585  3/1982  Matsumura ........................ 350/518

Primary Examiner—Bruce Y. Arnold
Assistant Examiner—Rebecca D. Gass
Attorney, Agent, or Firm—Donald W. Margolis

[57] ABSTRACT

The combination in optical series of a microscope objective lens system with a first positive lens system, and a focusing module, all in combination with one another and with such other components as are required to provide a microscope image, allows the user of such a microscope, to continuously alter the active focal relationships of the microscope by continuously varying the afocal variator and the distance of the microscope objective lens system from the object which is undergoing examination, and all without the need to physically change the length dimension of the microscope system, and without the need to change the positions of any of the lenses outside of the afocal variator, and without the need to change the microscope objective lens. The focusing module includes, a front negative lens system, an afocal variator optical system, and a rear positive optical system. The afocal variator optical system includes in optical series a front positive lens, a negative lens, and a rear positive lens. Within the afocal variator optical system the negative lens is so positioned and so controlled that it is capable of being moved continuously either towards and away from the first positive lens and towards and away from the second positive lens, all while the distance between the first positive lens and the second positive lens of the afocal variator optical system remains substantially constant, whereby the user of such a microscope may continuously vary the focus of the microscope.

7 Claims, 1 Drawing Sheet

U.S. Patent
Oct. 8, 1991
5,054,896
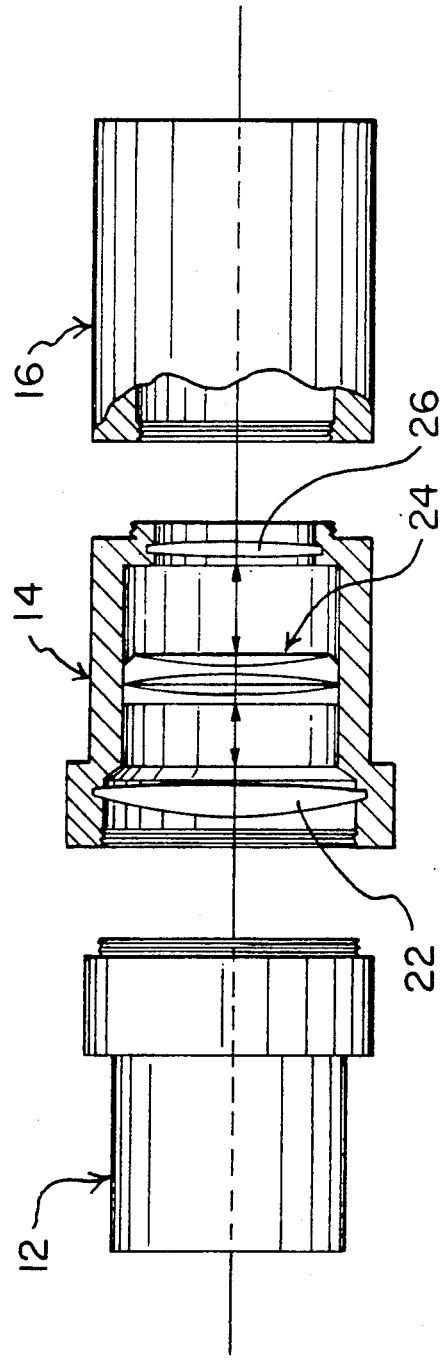
FIG. 1.—PRIOR ART
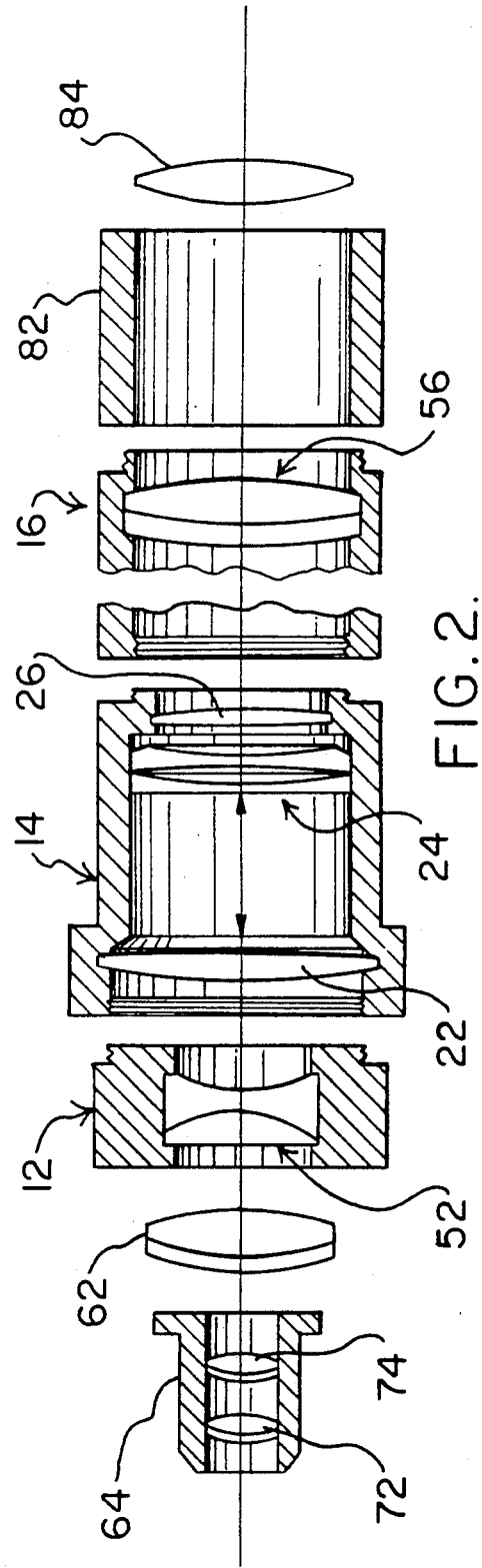
FIG. 2.

CONTINUOUSLY FOCUSABLE MICROSCOPE INCORPORATING AN AFOCAL VARIATOR OPTICAL SYSTEM

RELATED APPLICATIONS

This application is a continuation-in-part of U.S. Patent Application Ser. No. 286,307 entitled MODULAR AFOCAL VARIATOR OPTICAL FOCUSING SYSTEM filed by H. Jay Margolis on Dec. 19, 1988, now U.S. Pat. No. 4,988,173 which is in turn a continuation-in-part of U.S. Pat. Application Ser. No. 169,271, also entitled MODULAR AFOCAL VARIATOR OPTICAL FOCUSING SYSTEM filed by H. Jay Margolis on May 17, 1988, and now abandoned.

BACKGROUND OF THE INVENTION 1. a) Field of the Invention

This invention relates to a continuously focusable microscope system which incorporates an afocal variator system.

2. b) Discussion of the Prior Art

Microscopes have been in use for centuries. In the past, where it has been desired to alter the focus of microscope systems, this has usually been accomplished over a short range by continuously or discretely changing the length of the optical system of the microscope, or in discrete ranges by changing the location or type of objective lens system in the front, or of any lens system which may be present in the rear, or both the front and rear optical lens systems, if any. Altering microscopical system focal length without utilizing the objective lens system, or changing the length of the optical system, or changing the location or type of lens system in either the front or rear optical system is not believed to be known in the prior art. Continuously focusable microscope systems are not known to applicant. "Varios" and "variators" are well known and useful optical systems. Such systems have found use primarily in zoom lens systems and in projectors, for example, to change the size of a projected image on a screen, but not to focus the image. In many instances, such vario and variator devices have been used, in combination with a front optical system or a rear optical system. In some instances they have even been used in combination with both a front optical system and a rear optical system. However, in all instances known to applicant such optical systems which incorporate vario and variator optical systems have been used to alter the size of an image, but not to focus the image, and are used and usually only function at relatively short back focal distances.

Afocal variators of the specific preferred type described in the present application have been known and in commercial use and on sale, by themselves, for at least fifteen years, for example for use in projector lenses to alter the size of a projected image on a screen. However, while afocal variator optical systems of the specific type disclosed herein, have been previously known in the art, such afocal variator optical systems are not known to have been previously used in the art to focus microscope systems.

In the known prior art, Hillman U.S. Pat. No. 2,937,570 discloses a telescope system in which the image forming lenses are moved in order to focus the system. That is, focusing is accomplished by moving objective lens and focusing lens, which are part of the telescope's "formula-specific" objective imaging system. Focusing is not accomplished or taught to be feasible by moving a portion of an afocal variator, nor by moving a portion of any other non-image forming modular optical lens system. Furthermore, this reference discloses a "formula-specific" optical system in which the lenses are all calculated and assembled to work together to form a telescope. It does not include an independent optical lens system module which is non-image forming. It does not include a central afocal variator module which does not comprise a portion of the image-forming optics. If any of the movable lenses of any of the systems taught by Hillman were removed, the entire system would be affected, very probably to the point that the system would no longer function for its intended purpose.

In Quenderff French Patent 2,572,545 the use of a zoom lens to make enlarged pictures, and also teaches the use of various art known mechanical devices for connecting together optical modules. However, it neither teaches nor suggests the use of a central afocal variator module as a focusing element.

Therefore, while afocal variator optical systems have been previously known in the art, such afocal variator optical systems are not known to have been previously used in the art to focus microscope systems in the manner disclosed, provided and claimed by the present application. More, specifically such afocal variator optical systems have not been used at a relatively long back focus distance, as opposed to their prior art use to alter image size at a fixed focal plane. It will be seen, that while the use of varios and variators, either alone, or in combination with either a front optical system or a rear optical system are known, they are not known to have been used to provide a microscope system. More specifically, the combination in optical series of a microscope objective lens system with a first positive lens system, a first negative lens system, an afocal variator, and a positive rear optical system, all in combination with one another and with such other components as are required to provide a microscope image, allows the user of such a microscope, to continuously alter the active focal relationships of the microscope by continuously varying the afocal variator and the distance of the microscope objective lens system from the object which is undergoing examination, and all without the need to physically change the length dimension of the microscope system, and without the need to change the positions of any of the lenses outside of the afocal variator, and without the need to change the microscope objective lens. This is quite different than the use of a variator system to alter image size at a fixed focal plane, such as a zoom lens.

SUMMARY OF THE INVENTION

In view of the foregoing, it is an object of the present invention to provide a continuously focusable microscope system in which an afocal variator optical system, in combination with a front and rear optical system, is incorporated to alter the active focal length, and thereby the focus of the microscope system.

It is another object of the present invention to provide a microscope system which carries an afocal variator optical system to provide a relatively long back focus distance to thereby provide a continuously focusable system.

Another object of the present invention is to provide such a microscope system which includes in optical series a microscope objective lens system, a first positive lens system; and a focusing module which consists of a front positive lens system, an afocal variator optical system, and a rear positive lens, all in combination with one another and with such other components as are required to provide a microscope image, which combination allows the user of such a microscope, to continuously alter the active focal relationships of the microscope by continuously varying the afocal variator and the distance of the microscope objective lens system from the object which is undergoing examination, and all without the need to physically change the length dimension of the microscope system, and without the need to change the positions of any of the lenses outside of the afocal variator, and without the need to change the microscope objective lens.

Another object of the present invention is to provide such a microscope system in which the focusing module includes an afocal variator which consists of a second positive lens system, and a positive rear lens system, which second positive lens system and positive rear optical system are positioned in substantially fixed spaced relation to one another, and a negative lens which is positioned between such fixed second front positive lens and such rear positive lens, and which negative lens is designed and supported in the afocal variator in such a manner that it is capable of being moved toward and away from the second front positive lens or toward and away from the rear positive lens.

It is also an object of the present invention to provide such a microscope system which has a range of magnification which varies from about 0.2 times at about 15.2 cm (6 inches) to approximately 8.5 or 9.0 times at 0.8 cm (0.3 inch), approximately a 45 to 1 ratio, and which can be effectively used at infinity.

It is another object of the present invention to provide such a microscope system having a high depth of field.

Another object of the present invention is to provide such a microscope system using such a focusing module including an afocal variator, which microscope system is simple in construction and design.

It is yet another object of the present invention to provide such systems which are simple and inexpensive to produce.

The foregoing objects of the present invention are obtained by providing a microscope system which has the ability to vary the actual focal length of the system without the need to physically change the length dimension of the microscope system, or the need to change the lens system or lens position of the front optical system or the rear optical system, if any, or the need to change the lenses of the front optical system or in the rear optical system, if any. As used throughout this application, "afocal variator optical system" shall mean an optical system which includes in optical series a positive lens (which will sometimes be referred to as the "second positive lens" or the "front positive lens"), a negative lens (which will sometimes be referred to as the "second negative lens"), and another positive lens (which will sometimes be referred to as the "third positive lens" or the "rear positive lens"). Within the afocal variator, the negative lens is so positioned and so controlled that it is capable of being moved continuously either towards and away from the front (second) positive lens and towards and away from the rear (third) positive lens, all while the distance between the front positive lens and the rear positive lens of the afocal variator optical system and the length of the afocal variator remains substantially constant. Further, as used throughout this application, the term "focusing module" shall mean an optical system which includes in optical series a negative lens system (which will sometimes be referred to as the "first negative lens"), located in optical series in front of the afocal variator and a rear positive optical system (which will sometimes be referred to as the "fourth positive lens"), which is located in optical series to the rear of the afocal variator.

In preferred embodiments of the present invention there is provided the combination, in optical series, of a microscope objective lens system, a first positive lens system, and a focusing module, all in combination with one another and with such other components as are required to provide a continuously focusable microscope image. In substantially all uses of the present invention, the components of the microscope system, and especially the components of the focusing module are substantially permanently connected together in a manner which maintains the components of the system in optical series and as a unit having a substantially fixed length. In the preferred embodiment of the present invention disclosed herein a microscope system is provided which has the ability to provide a high depth of field and to focus from infinity to about a fraction of an inch.

While not known with scientific certainty, it is believed that the present invention provides a microscope system in which the afocal variator optical system alters the focal length, and module"shall mean an optical system which includes in optical series a negative lens system (which will sometimes be referred to as the "first negative lens" , located in optical series in front of the afocal variator and a rear positive optical system (which will sometimes be referred to as the "fourth positive lens"), which is located in optical series to the rear of the afocal variator.

In preferred embodiments of the present invention there is provided the combination, in optical series, of a microscope objective lens system, a first positive lens system, and a focusing module, all in combination with one another and with such other components as are required to provide a continuously focusable microscope image. In substantially all uses of the present invention, the components of the microscope system, and especially the components of the focusing module are substantially permanently connected together in a manner which maintains the components of the system in optical series and as a unit having a substantially fixed length. In the preferred embodiment of the present invention disclosed herein a microscope system is provided which has the ability to provide a high depth of field and to focus from infinity to about a fraction of an inch.

While not known with scientific certainty, it is believed that the present invention provides a microscope system in which the afocal variator optical system alters the focal length, and therefore intercepts various focal planes of the microscope objective lens system in conjunction and combination with the fourth positive lens system. It is believed that this modifies the microscope system as if either an infinite number of lenses had been put in the place of the afocal variator optical system, or as though a substantial variable length of separation is provided between the front elements of the optical system and the rear elements of the optical system. Therefore, for example, where there is provided the combination, in optical series, of a microscope objective lens system, a first positive lens system, and a focusing module, all in combination with one another, it is believed that the change in the focal length of the microscope objective system, the first positive lens, and the front (first) negative lens in the focusing module which is caused by the afocal variator optical system provides a substantially infinite number of forward conjugate foci in combination with the rear (fourth) positive lens system, thereby providing a continuously focusable microscope system.

The system of the present invention is not formula-specific. It uses an independent non-image forming afocal variator lens system which does not comprise a portion of the image-forming optics in the microscope systems in which it is included. If the afocal variator of the present invention, which includes a movable lens for purposes of focusing the entire system, were removed in its entirety, the remaining system modules would be substantially unaffected, and the remaining system components could still function as a microscope when used at close range and with an appropriate front conjugate lens system. Therefore, the microscope systems of the present invention, without the focusing module, and in combination with a specific objective lens optical systems, could still be used as a microscope.

These and other objects of the present invention will become apparent to those skilled in the art from the following detailed description, showing the contemplated novel construction, combination, and elements as herein described, and more particularly defined by the appended claims, it being understood that changes in the precise embodiments of the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments of the present invention according to the best modes presently devised for the practical application of the principles thereof, and in which:

FIG. 1 is an exploded diagrammatic view, partially broken away, which illustrates a prior art fixed length afocal variator optical system module of the present invention in which positioned between a front optical system module and a rear optical system module, for connection therewith; and FIG. 2 is a species of FIG. 1, shown in exploded view, is a microscope system in which a microsnrnobjective lens system, a first positive lens system, and a focusing module are in combination with one another and with such other components as are required to provide a continuously focusable microscope image.

DESCRIPTION OF THE PRIOR ART

Referring to FIG. 1 there is shown, primarily for reference purposes, the basic teaching of the parent applications, of which this application is a continuation-in-part U.S. Pat. Application Ser. No. 286,307 entitled MODULAR AFOCAL VARIATOR OPTICAL FOCUSING SYSTEM filed by H. Jay Margolis on Dec. 19, 1988, now U.S. Pat. No. 4,988,173 issued Jan. 29, 1996, which is in turn a continuation-in-part of U.S. Pat. Application Ser. No. 169,271, also entitled MODULAR AFOCAL VARIATOR OPTICAL FOCUSING SYSTEM filed by H. Jay Margolis on May 17, 1988, and now abandoned. Shown in exploded view is an optical system, generally 10 consisting of three major modular components which are designed for substantial permanent connection to one another, a front modular optical system 12, an afocal variator modular optical system 14, shown broken away, and a rear modular optical system 16 shown partially broken away. As illustrated, the afocal variator optical system 14 consists of a fixed length tube 20 in which there is located a front positive lens 22, a central negative lens 24, in this case a negative doublet, and a rear positive lens 26. Front positive lens 22 and rear positive lens 26 are secured to tube 20 in a manner such that the distance between them is substantially fixed. However, negative lens 24 is located within tube 20 and constructed in such a manner that it can be moved continuously within tube 20 up and back between front lens 22 and rear lens 26. That is, negative lens 24 is capable of being moved towards and away from front lens 22 and is also capable of being moved towards and away from rear lens 26.

The foregoing is made possible by the system for holding the lenses of the afocal variator optical system 14. This holding system may consist of tube 20, as shown, or of any other lens holding system, such as a lens positioning platform system of the type that is well known in the art, or the like. As shown, tube system 20 includes front connecting means, in this case a series of female threads 28 and rear connecting means, in this case a series of male threads 30, to which front optical system 12 and rear optical system 16 can be appropriately connected by means of their own respective male and female thread connectors 32 and 34. Negative lens 24 may be moved within tube 20 by a linear slider, a helical slider, or by any other art known means for providing continuous linear motion to a lens. While not preferred in the practice of the present invention, both front optical system module 12 and rear optical module system 16 may carry substantially any known lens system.

The combination of an afocal variator optical system module 14 with a front optical system module 12, as taught by the parent applications, is believed to have the unique feature of altering or varying the actual focal length of front optical system 12, whether in the form of a real image, as provided by a positive lens, or in the form of a virtual image as provided by a negative lens. The resulting variation of the focal length effects the convergence or divergence of the light which enters rear optical system 16, and therefore of the light (or image) which exits from rear optical system 16. This allows the focus of the system to be changed without changing the length of the overall system or of any modular element in the system, and without changing the lenses in the front or rear modular system.

DESCRIPTION OF THE PREFERRED EMBODIMENT

Now referring to FIG. 2, there is shown the present invention in which the system serves as a continuously focusable microscope having a wide range of magnification and a high depth of field. In this species, afocal variator optical system module 14 is substantially the same as that shown in FIG. 1, although negative lens 24 is shown located substantially adjacent rear positive lens 26. In this system, afocal variator optical system module 14 is connected to a front optical system 12 which includes a negative achromat doublet 52, while rear optical system 16 includes a positive achromat 56, also in the form of a doublet. Together, front optical system 12 including negative achromat doublet 52, afocal variator optical system 14, and rear optical system 16 including positive achromat 56 form the "focusing module". Located in front of front optical system 12 is a positive lens, in this case a positive achromat doublet 62, while in front of that is a microscope objective lens system 64. Objective lens system 64 consists in this example of a pair of positive achromat doublets 72 and 74, although substantially any objective lens system may be used in this system. Elements 82 and 84, representative of a tube and an eye piece lens, respectively, are also illustrated; however any other art known elements may be provided to complete the microscope.

In one preferred embodiment of the present invention front optical system 12 includes a front lens 52 of about −109, a positive achromat doublet 62 of about +50 mm, and an objective lens system 64 with about a 10 mm focal length, and rear optical system 16 including a conjugate lens 56 of about +75, provides about a 260 mm tube-length behind rear optical system 16, forming an intermediary image in the plane at that distance. The system of FIG. 2 using the elements just described has been found to allow focusing from infinity to about 0.8 cm (0.3 inch) with a final primary magnification of about 8.5 or 9.0 times, while providing, even at the closest focus, a substantial depth of field.

In this specific embodiment, as in the copending applications of applicant, the afocal variator optical system acts as though it is changing the distance between the front lens systems and the rear lens systems without any actual change in the length dimension of the system. It also provides the ability to choose between four variables for the best effects of each, such as magnification, depth of field, working distance and resolution. The back focal length can vary but is approximately 260 mm from the rear of rear lens system 16 to the image plane of the microscope. The back focal length is so long it can be adapted to interface with substantially any observation tube or observation means now known. As described above, one of the ranges of magnification varies from 0.2 times at 6 inches to approximately 8.5 or 9.0 times at 8 mm, thereby providing approximately a 1 to 45 ratio of magnification in that range. The ratio can be increased if used at an initial longer stand off distance, and focus can be achieved at distances greater than 6 inches, and in fact to infinity.

While not shown in FIG. 2, the addition of art known diaphragms between the afocal variator optical system 14 and positive achromat lens 56 in rear optical system 16 will enhance the ability of the system to obtain an excellent depth of field and control aberrations. Unlike so many other microscope systems, the optical systems of the present invention which are combined with the afocal variator do not appear to be limited, other than by compatibility, by the material from which the lenses are composed, the refractive indices of the lenses, the light dispersive characteristics of the lenses, or the radii of the lenses.

It is therefore seen that the present invention provides a continuously focusable microscope system in which an afocal variator optical system, in combination with a front and rear optical system forms a focusing module which may be incorporated to alter the active focal length, and thereby the focus of microscope system to provide a relatively long back focus distance, and a continuously focusable system. The microscope system of the present invention includes in optical series a microscope objective lens system, a first positive lens system, and a focusing module which consists of a front negative lens system, an afocal variator optical system, and a rear positive lens, all in combination with one another and with such other components as are required to provide a microscope image. This combination of optical elements and systems allows the user of such a microscope, to continuously alter the active focal relationships of the microscope by continuously varying the afocal variator and the distance of the microscope objective lens system from the object which is undergoing examination, and all without the need to physically change the length dimension of the microscope system, and without the need to change the positions of any of the lenses outside of the afocal variator, and without the need to change the microscope objective lens. The microscope system of the present invention is found to provide an exceptionally high depth of field. The microscope system of the present invention is simple in construction and design and inexpensive to produce.

While the invention has been particularly shown, described and illustrated in detail with reference to preferred embodiments and modifications thereof, it should be understood by those skilled in the art that the foregoing and other modifications are exemplary only, and that equivalent changes in form and detail may be made therein without departing from the true spirit and scope of the invention as claimed, except as precluded by the prior art.

What is claimed is:

1. A microscope system which includes an afocal variator, comprising, in optical series:
   means for providing a microscope objective lens system;
   means for providing a positive lens system for use as a microscope objective; and
   a focusing module, wherein said focusing module includes, in optical series, a front negative lens system, an afocal variator, and a rear portion lens system, wherein said afocal variator carried by said focusing module includes in optical series a first positive lens, a negative lens, and a second positive lens, and wherein further said negative lens within said afocal variator is so positioned and so controlled that it is capable of being moved continuously towards and away from said first positive lens, and towards and away from said second positive lens, all while the distance between said first positive lens and said second positive lens of said afocal variator remains substantially constant.

2. The optical system of claim 1 wherein said negative lens in said afocal variator optical system is a negative doublet lens.

3. The optical system of claim 1, wherein said front negative lens system is a negative achromat doublet.

4. The optical system of claim 3, wherein said rear positive lens system is a positive achromat doublet.

5. The optical system of claim 4, wherein said positive lens system is a positive achromat doublet.

6. The optical system of claim 1, wherein said rear positive lens systems is a positive achromat doublet.

7. The optical system of claim 1, wherein said positive lens system which is in optical series intermediate said microscope objective lens system and said focusing module is a positive achromat doublet.

* * * * *